(12) United States Patent
Gendreau

(10) Patent No.: US 9,242,441 B1
(45) Date of Patent: Jan. 26, 2016

(54) HEATING DEVICE FOR USE WITH A CLAMP FOR LAMINATING SUBSTRATES

(71) Applicant: Errol Gendreau, Eloy, AZ (US)

(72) Inventor: Errol Gendreau, Eloy, AZ (US)

( * ) Notice: Subject to any disclaimer, the term of this patent is extended or adjusted under 35 U.S.C. 154(b) by 101 days.

(21) Appl. No.: 14/107,999

(22) Filed: Dec. 16, 2013

Related U.S. Application Data

(60) Continuation-in-part of application No. 13/367,194, filed on Feb. 6, 2012, now Pat. No. 8,617,342, which is a division of application No. 12/135,931, filed on Jun. 9, 2008, now Pat. No. 8,109,314.

(60) Provisional application No. 60/942,595, filed on Jun. 7, 2007.

(51) Int. Cl.
| | | |
|---|---|---|
| *B29C 65/20* | (2006.01) | |
| *B32B 37/06* | (2006.01) | |
| *H01H 37/00* | (2006.01) | |
| *B29C 73/30* | (2006.01) | |
| *B29C 65/00* | (2006.01) | |
| *B29C 35/08* | (2006.01) | |

(52) U.S. Cl.
CPC ............... *B32B 37/06* (2013.01); *B29C 65/20* (2013.01); *H01H 37/006* (2013.01); *B29C 66/8122* (2013.01); *B29C 73/30* (2013.01); *B29C 2035/0822* (2013.01)

(58) Field of Classification Search
CPC   B29C 65/20; B29C 73/30; B29C 2035/0822; B29C 66/8122; H01H 37/006
USPC .............................................. 156/583.6–583.7
See application file for complete search history.

(56) References Cited

U.S. PATENT DOCUMENTS

| | | | | |
|---|---|---|---|---|
| 3,174,892 | A * | 3/1965 | Fichtner ...................... | 156/583.3 |
| 4,310,745 | A * | 1/1982 | Bender ......................... | 219/213 |
| 4,346,286 | A * | 8/1982 | Romp ........................... | 219/501 |
| 4,820,905 | A * | 4/1989 | Iwata et al. .................. | 219/390 |
| 4,822,450 | A * | 4/1989 | Davis et al. .................. | 438/709 |
| 5,359,179 | A * | 10/1994 | Desloge et al. .............. | 219/535 |
| 2006/0091133 | A1 * | 5/2006 | DiPucchio et al. ........... | 219/545 |

* cited by examiner

*Primary Examiner* — Scott W Dodds
(74) *Attorney, Agent, or Firm* — Schmeiser, Olsen & Watts LLP

(57) ABSTRACT

A heating device for use with a clamp for laminating substrates is provided. The heating device includes a support member, a heater control device coupled to the support member and a heater cartridge. The heater cartridge includes a cartridge housing retaining an insulation pad, an infrared reflector and a heating element, wherein the heating element is operatively coupled to the heater control device to control current flowing through the heating element, and wherein the support member is coupled to a clamp for laminating substrates. The insulation pad may be formed of a ceramic carbon fiber material and the infrared reflector may be formed of a reinforced Mylar sheet.

10 Claims, 5 Drawing Sheets

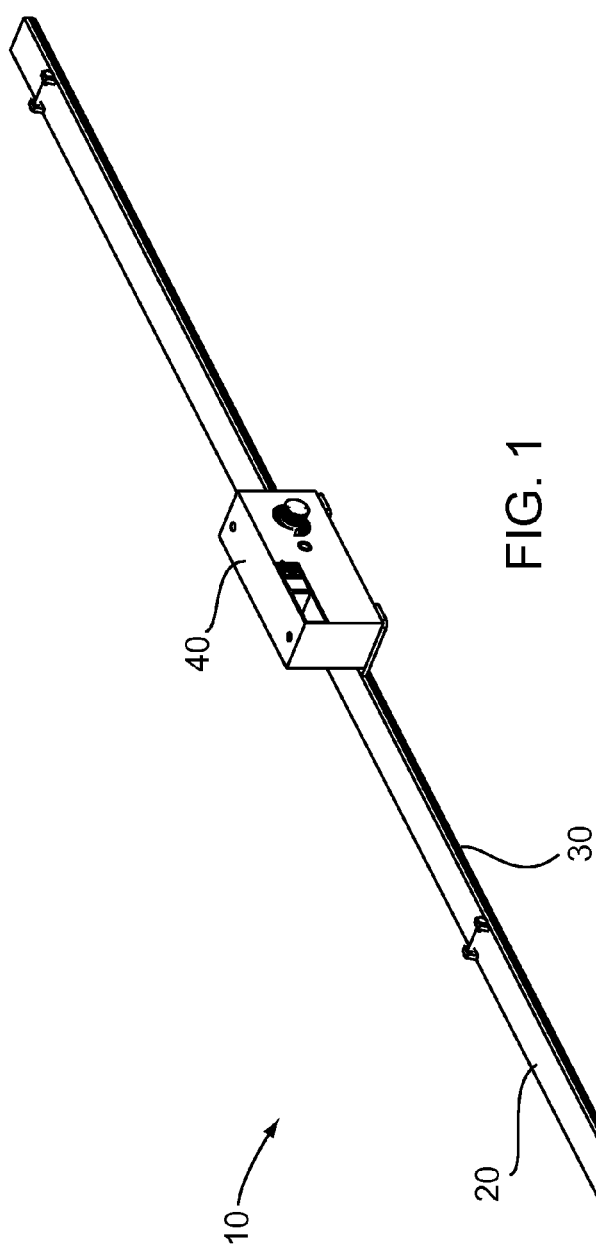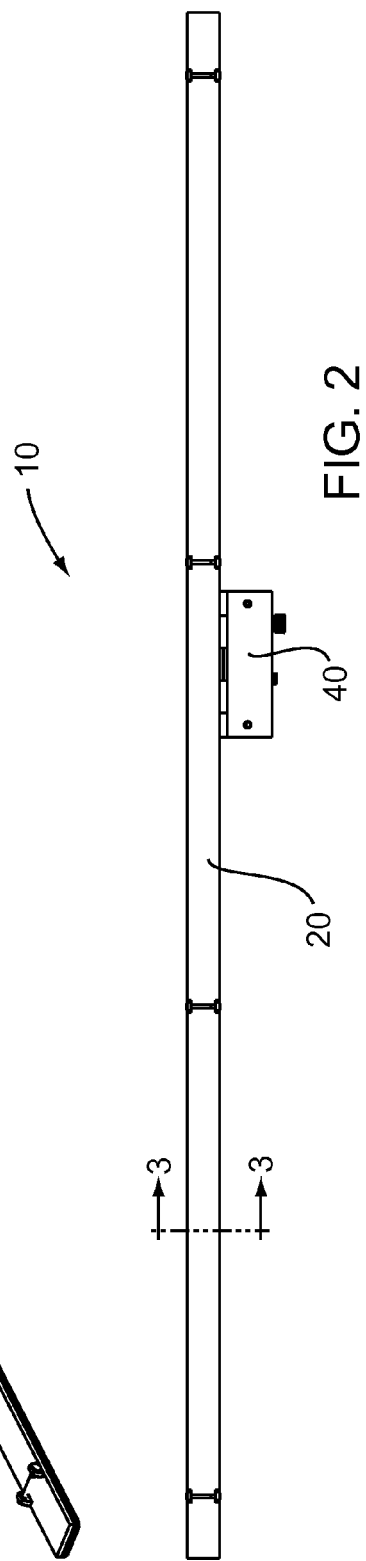

HEATING DEVICE FOR USE WITH A CLAMP FOR LAMINATING SUBSTRATES

CROSS REFERENCE TO RELATED APPLICATION

This application is a continuation-in-part of U.S. Patent Application entitled "AIR CLAMP," Ser. No. 13/367,194, filed Feb. 6, 2012, now pending, which is a divisional application of U.S. Patent Application entitled "AIR CLAMP," Ser. No. 12/135,931, filed Jun. 9, 2008, now U.S. Pat. No. 8,109,314, which claims priority to U.S. Provisional Patent Application entitled "AIR CLAMP," Ser. No. 60/942,595, filed Jun. 7, 2007, the disclosures of which are hereby incorporated entirely herein by reference.

BACKGROUND OF THE INVENTION

1. Technical Field

This invention relates generally to a heating device for a clamp, and more specifically, this invention relates to a heating device for use with a clamp used during laminating of substrates.

2. State of the Art

In the manufacture of laminated articles, an adhesive layer is disposed at the interface between two substrates to be laminated. The two substrates are then clamped in place at selected intervals along their length while the adhesive cures using, for example, multiple C-clamps. The adhesives typically used, are specialty glues that require tight temperature control over a fairly narrow temperature range with specific requirements in order for the adhesive to have and maintain its intended strength and glue properties. Conventional methods for curing these types of specialty glues have included the use of heat lamps and forced heated air. These curing procedures have disadvantages.

Among these disadvantages is the heating of the entire laminated pieces to aid in the curing process is accomplished by use of heat lamps. The use of heat lamps results in a great deal of wasted energy since most of the heat is lost into the surrounding environment. Utilizing heat lamps causes uneven heating, uneven curing and, thus, uneven bonding, resulting in an inferior laminated product that is likely to crack and break due to the lack of tight temperature control of the heat application of the glue itself. Alternatively, use of heated forced air across the substrates to reach the desired temperature range has been employed. This approach has the same disadvantages as the use of heat lamps.

Accordingly, there is a need in the field of tools and methods for laminating substrates for an improved heating device.

DISCLOSURE OF THE INVENTION

The present invention relates to a heating device for use with a clamp used during lamination of substrates.

Embodiments of the present invention include a heating device for use with a clamp for laminating substrates. The heating device includes a support member; a heater control device coupled to the support member; and a heater cartridge comprising a cartridge housing retaining an insulation pad, an infrared reflector and a heating element, wherein the heating element is operatively coupled to the heater control device to control current flowing through the heating element, and wherein the support member is coupled to a clamp for laminating substrates.

Some embodiments include a heating device for use with a clamp for laminating substrates. The heating device includes a support member; a heater control device coupled to the support member; a heater cartridge comprising a cartridge housing retaining a ceramic carbon fiber insulation pad, an reinforced Mylar infrared reflector and a heating element, wherein the heating element is operatively coupled to the heater control device to control current flowing through the heating element, and wherein the support member is coupled to a clamp for laminating substrates; a first sensor located at the heating element and operatively coupled to the heater control device; and a second sensor configured to couple near an adhesive layer between substrates to be laminated and operatively coupled to the heater control device, wherein the heater control device activates and deactivates current flow through the heating element in response to temperature readings from the first and second sensors.

Yet another embodiment includes a method of using a heating device for use with a clamp for laminating substrates. The method includes coupling a heating device to a clamp for laminating substrates; engaging the clamp on two substrates to be laminated, wherein a heating element of the heating device is in contact with one of the substrates; activating flow of current through the heating element to raise the temperature of the substrate into an optimal range; and curing an adhesive layer between the two substrates, wherein the heating device is located in the general area of the adhesive layer.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, the Figures are not necessarily drawn to scale, and:

FIG. 1 is a perspective view of a heating device according for use with a clamp;

FIG. 2 is a top view of a heating device according for use with a clamp;

DETAILED DESCRIPTION OF EMBODIMENTS OF THE INVENTION

Figure 3:
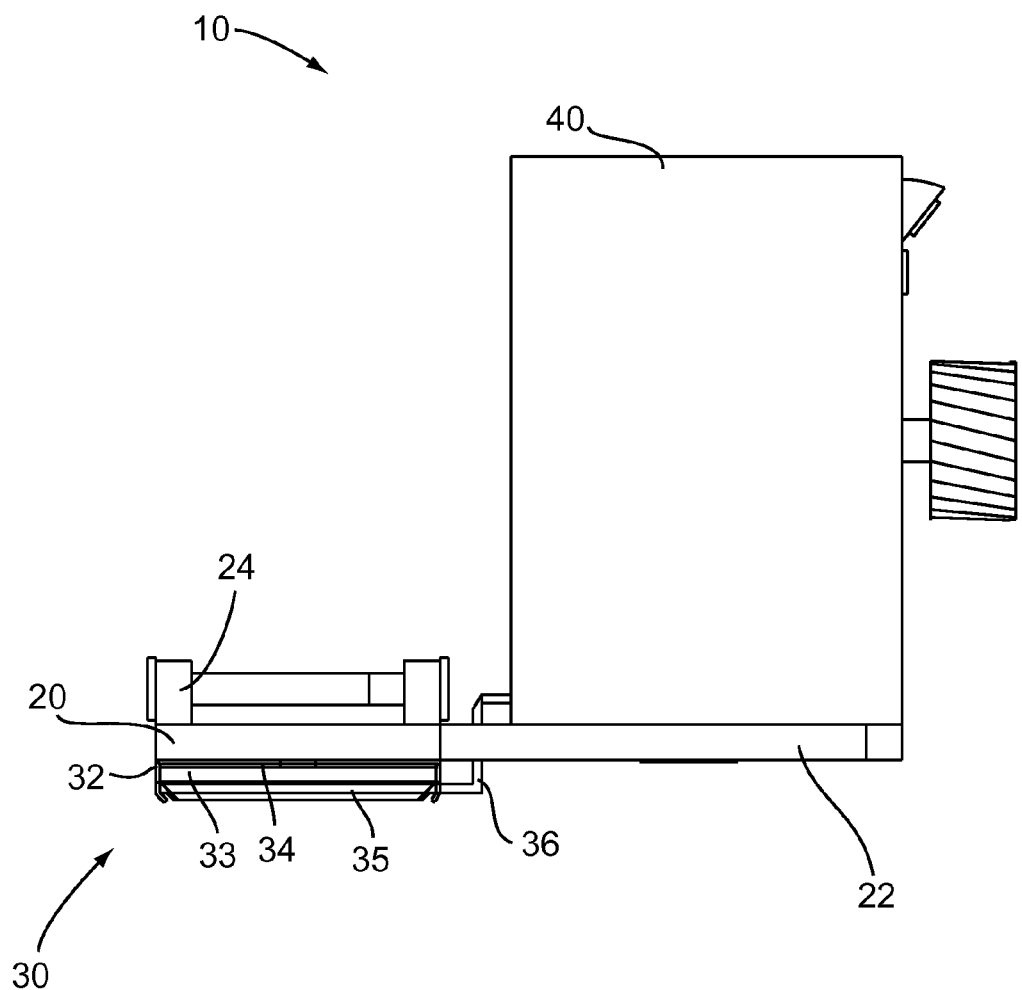
FIG. 3 is a section view taken along line 3-3 of a heating device according for use with a clamp.

The lamination of stone substrates together requires a glue to be used. The glue necessary for laminating stone does not cure properly if the temperature that the glue is in is too cold. For optimal results, a narrow temperature range for maintaining the glue during curing is specified by the manufacturer of the adhesive. As discussed above current approaches to providing an optimal environment to cure the glue utilizes heat lamps or heated forced air results in heat loss to the environment and further heats the whole substrate in a poor and unpredictable manner and runs the risk of unintended and unexpected glue characteristics.

As discussed in this disclosure, embodiments of the present invention relate to a heating device for use with a clamp used during lamination of substrates. The heating device provides localized heat to substrates being laminated and reduces most of the heat losses realized by the use of conventional methods. Further, the heating device greatly improves the absolute temperature control of the adhesives to whatever the manufacturer's specifications are for the adhesive being used.

Referring to the drawings, FIGS. 1-4 depict an embodiment of a heating device 10 for use with a clamp during lamination of substrates. The heating device 10 generally includes a support member 20, a heater cartridge 30 and a heater control device 40. The heater cartridge 30 is coupled to a bottom side of the support member 20. The heater control device 40 is coupled to protrusions forming control supports 22. The support member 20 further includes mounts 24, wherein mounts 24 are utilized to connect the heating device 10 to a clamp.

The heater cartridge 30 comprises a cartridge housing 32 that houses inner components that include an insulation pad 33, an infrared reflector 34 and a heating element 35. The heating element includes a lead 36 that operatively connects to the heater control device 40 when the heating device 10 is assembled. According to particular embodiments, the cartridge housing 32 protects the inner components from damage and works in conjunction with support member 20 to distribute the force in a horizontal surface area from a point force.

While the insulation pad 33 may be formed of any type of insulating material, in some embodiments, the insulation pad 33 is a ceramic carbon fiber insulation pad. The ceramic carbon fiber material has decreased density as compared to other insulation material and further reduces losses dues to conduction. Further, ceramic carbon fiber material is compressible and allows for the material to return to the shape prior to compression.

While the reflector 34 may be formed of any reflective material, particularly material that reflects infrared rays, in some embodiments, the infrared reflector 34 is formed of a reinforced Mylar sheet. The reinforced mirrored Mylar infrared reflector redirects the heat in the desired direction.

The heating element 35 localizes the heat to bring the substrate up to temperature at the location of where glue was applied. The heating element 35 is in direct contact with the substrate to be laminated.

Figure 4:
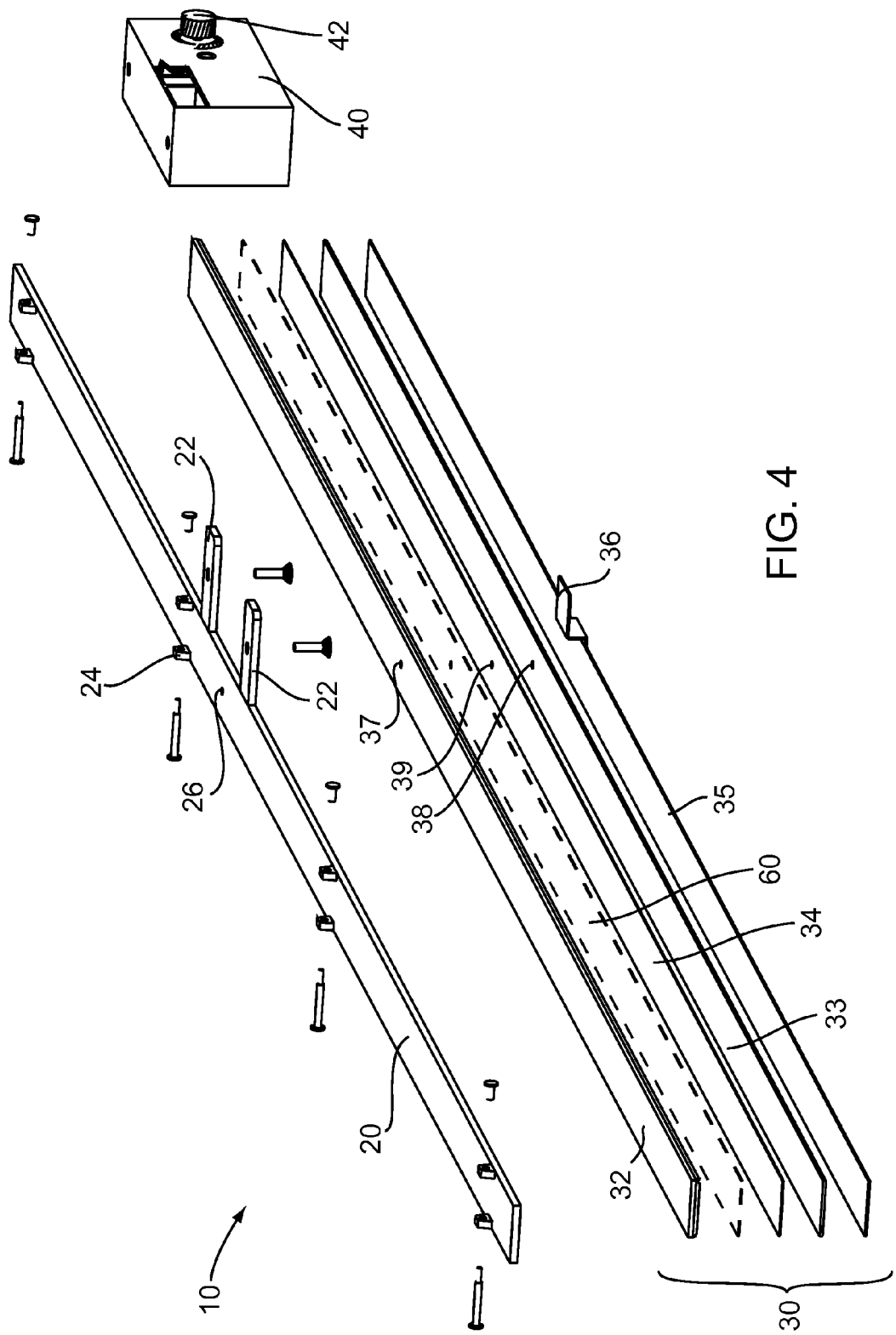
FIG. 4 is an exploded view of a heating device according for use with a clamp.

In embodiments, the inner components of the heater cartridge 30 are coupled within the cartridge housing 32 in a specific order. As shown in FIGS. 3 and 4, this order is infrared reflector 34, insulation pad 33 and then heating element 35. Therefore, when coupled within cartridge housing 32, the infrared reflector 34 is between the insulation pad 33 and the cartridge housing 32, and the insulation pad 33 is between the heating element 35 and the infrared reflector 34. The heating element 35 is exposed on one side in order contact a surface of the substrate to be laminated. This configuration of the infrared reflector 34, insulation pad 33 and heating element 35 operate to direct heat from the heating element toward the stone substrate to be laminated and further protect the cartridge 30, support member 20 and clamp from damage that can be caused from high temperatures.

This configuration provides for greater efficiency of heating while protecting the housing and the clamp from damage. For example, and without limitation, in some embodiments of the heater cartridge 30, the heating element 35 is in direct contact with the substrate to be laminated. This allows heat, such as infrared radiation, to be transferred from the heating element 35 to the substrate through the direct contact. The heating element 35, however, may be a very thin heating element, wherein heat is generated and directed in directions that are substantially perpendicular to the heating element 35. The heat generated is therefore directed directly toward the substrate and then in an opposite direction away from the substrate out of the other side of the heating element 35.

Placing the insulation layer 33 operates to stop conduction of the heat because the mass is low and the resistance is high. Because of the high resistance to the heat, the pad is an insulator to prevent heat from being carried to the cartridge housing 32 and to the rest of the clamping device. This limits the opportunity of damage to the clamp due to high temperatures that are created by the heating element 34.

In order to limit the amount of heat loss from the heating element 35 that is being directed away from the substrate, the next layer in the heater cartridge 30 is the reflective layer 34. The reflective layer 34 reflects infrared radiation. Placing the reflective layer 34 adjacent the insulation pad 33 allows for reflection of the infrared radiation from the heating element 35 that travels through the insulation pad 33 to be directed back toward the heating element 35 and the substrate, thereby reducing loss.

In order to further limit the heat loss and to form a barrier of protection to the rest of the clamping device, some embodiments of the present invention include an insulation layer 60 is placed adjacent the reflective layer 34, and between the reflective layer 34 and the cartridge housing 32. The insulation layer 60 operates to stop conduction of the heat because the mass is low and the resistance is high. Because of the high resistance to the heat, the pad is an insulator to prevent heat through conduction from being carried to the cartridge housing 32 and to the rest of the clamping device. This limits the opportunity of damage to the clamp due to high temperatures that are created by the heating element 35.

Accordingly, because the heating element 35 is in direct contact with the substrate to better heat the substrate, the insulation pad 33 is next to operate to inhibit movement of heat; and then the reflective layer 34 operates to reflect the heat that is released from the opposite side of the heating element 35 to be directed toward the substrate in order to improve the efficiency and reduce the heat loss and further to protect the cartridge housing 32 from excessive heat. In at least this way, the specific order of the layers of the heater cartridge 30 is important. In other embodiments where an insulation layer 60 is provided between the reflective layer 34 and the cartridge housing 32, the specific order of layers is also important for the reasons stated above with the addition of another insulation layer to inhibit transfer of heat through conduction to the cartridge housing 32 and the rest of the clamping device.

In some embodiments, the cartridge housing retains each the inner components by a crimping connection, wherein edges of the cartridge housing 32 are crimped around all three inner components to retain then within the cartridge housing 32. Other means for retaining each of the inner components within the cartridge housing 32 may be used, such as clamping, use of adhesives, fasteners, and the like.

The heater control device 40 includes a control knob 42 to turn on the heating device 10 and initiate current flowing through the heating element 35, thereby activating the heating element. The heater control device also includes a memory to store preset temperature information and a processor to process data received from sensor wherein, the processor determines when to activate current through the heating element 35 and when to deactivate current through the heating element 35.

The heater control device 40 is operatively connected to a first sensor and a second sensor. The first sensor is located adjacent to the heating element and the second sensor is located adjacent the adhesive or glue. The heater cartridge 30 includes aperture 26, cartridge housing 32 includes aperture 37, insulation pad 33 includes aperture 38 and infrared reflector 34 includes aperture 39. Each of the apertures corresponds to one another, such that the first sensor extends through the apertures 26, 37, 38, and 39 and contacts the heating element. In this configuration, the first sensor determines the temperature of the heating element, wherein the heater control device 40 processes the temperature reading form the first sensor and the processor automatically compares the temperature reading from the first sensor with a preset maximum operating temperature of the heating element 35. The heater control device 40 deactivates current through the heating element 35 in response to receiving a temperature reading from the first sensor above the preset maximum operating temperature of the heating element 35. Once the temperature of the heating element drops to a preset value less than the maximum operating temperature, the heater control device 40 activates current through the heating element 35.

The second sensor is located near the adhesive layer or glue between the substrates being laminated in order to measure the temperature of the adhesive layer. The second sensor determines an absolute temperature reading of the immediate environment of the adhesive layer and sends the absolute temperature reading to the heater control device 40. The heater control device 40 processes the temperature reading form the second sensor and the processor automatically compares the temperature reading from the second sensor with a preset laminating temperature. The heater control device 40 deactivates current through the heating element 35 in response to receiving an absolute temperature reading from the second sensor above the preset laminating temperature. Once the absolute temperature of the adhesive layer drops to a preset value less than the laminating temperature, the heater control device 40 activates current through the heating element 35. While it is shown that the heater control device 40 operates automatically, an alternative includes the temperature information provided by the sensors may be used by an operator to manually adjust the supply of power to the heating element 35.

The first sensor operates to control the temperature of the substrates being laminated. In embodiments, the heating device 10 applies heat directly to the substrates because the heating device 10 is in direct contact with the substrates and according heat is being applied directly to the substrate along the length of the heating device. The substrate will continue to rise in temperature when the heating device is deactivated in response to the reading from the sensor. Accordingly, the type of substrate is also considered by the sensors in determining what temperature at which the heating device 10 should be deactivated. The timing is important in order to turn of the heating device in a time that will account for the continued heating of the substrate, thereby ensuring that the temperature remains within an optimal range for curing the substrates to be laminated.

Because of the configuration of the heating device 10, the heating device 10 provides uniform heat distribution along the substrate being laminated and provides for a more controllable temperature relative to the use of heat lamps. Uniform heat distribution results in more uniform curing of the adhesive and, therefore, more uniform bonding between the substrates. Additionally, energy consumption is more efficient when using the heating device 10 instead of heat lamps as discussed above. Further, the heating element provides for a gradual heating rate to avoid issues with thermal expansion of the substrate.

Figure 5:
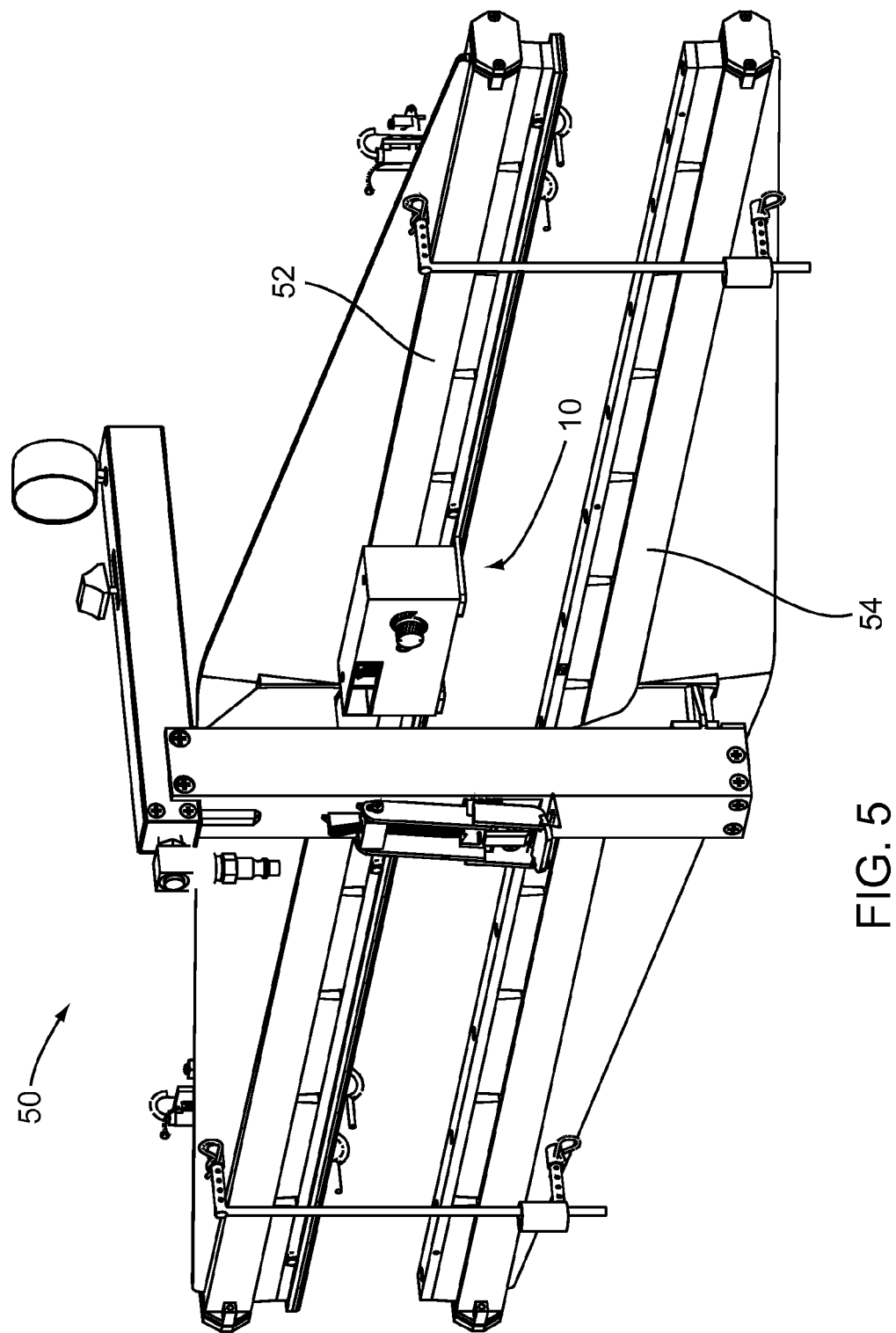
FIG. 5 is a perspective view of a heating device attached to a clamp, in accordance with an embodiment of the invention.
Figure 6:
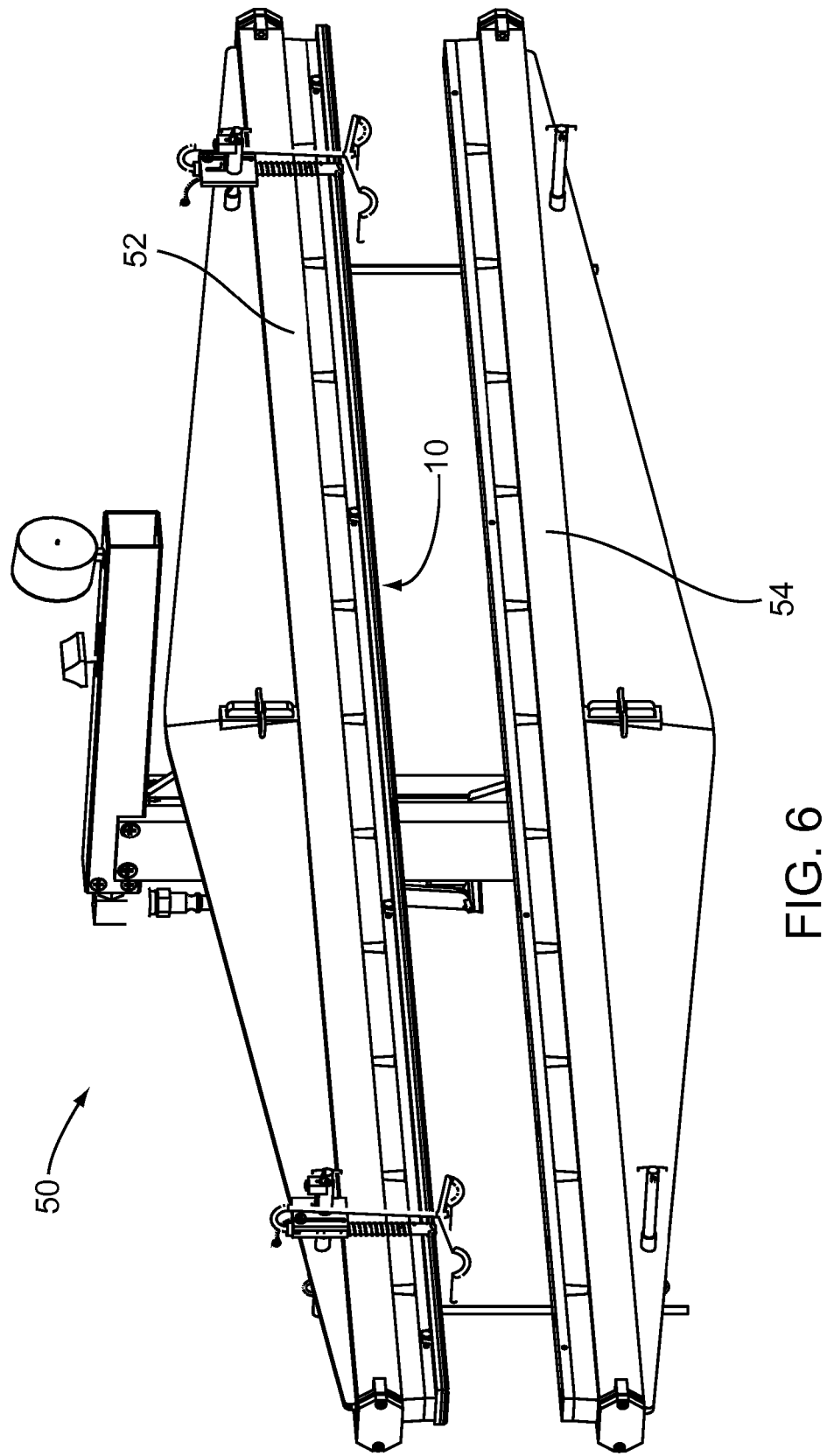
FIG. 6 is another perspective view of a heating device attached to a clamp, in accordance with an embodiment of the invention.

Referring to FIGS. 5 and 6, the heating device 10 may be coupled to a clamp 50, wherein the clamp 50 has an upper member 52 and a lower member 54. As shown, the heating device 10 is connected to the upper member 52 of the clamp 50. It will be understood that in other embodiments, the heating device 10 can be coupled to the lower member 54. In other embodiments, a heating device may be coupled to both the upper member 52 and the lower member 54. The clamp 50 then operates to clamp two substrates together with an adhesive layer between to apply pressure between the layers during curing of the adhesive layer to improve the bond of the adhesive layer to the substrates. This is improved by providing localized heat through heating device 10 that is in direct contact with the substrate during clamping. Further, the heating device 10 is configured to deform during clamping. The deformation is a slight deformation to account for deformities or inconsistencies along a surface of the substrate to be cured. This allows for consistent pressure and even distribution of heat along the length of the heating device 10.

It will be understood that while a particular clamp 50 has been shown in the drawing figures, the heating device 10 is not limited to use with only the depicted type of clamp, but rather heating device 10 is universal and can be utilized with any clamp type used for laminating substrates.

Embodiments include a method of using a heating device for use with a clamp for laminating substrates. The method includes the steps of coupling a heating device to a clamp for laminating substrates; engaging the clamp on two substrates to be laminated, wherein a heating element of the heating device is in contact with one of the substrates; activating flow of current through the heating element to raise the temperature of the substrate into an optimal range; and curing an adhesive layer between the two substrates, wherein the heating device is located in the general area of the adhesive layer.

Further, the method includes connecting a first sensor to the heating element; and connecting a second sensor adjacent the adhesive layer. In addition to connecting the first and second sensors to the heating element and adjacent the adhesive layer, the method also includes deactivating current flow through the heating element in response to a temperature reading of the first or second sensor above a respective first preset temperature. The method further includes, activating current flow through the heating element in response to a temperature reading of the first and second sensor below a respective second preset temperature.

In some embodiments, the method further includes directing heat from the heating element to the substrate to be laminated by use of a ceramic carbon fiber insulation pad, reinforced Mylar infrared reflector and heating element configuration, wherein the insulation pad and infrared reflector direct the heat toward the substrate.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the invention.

The invention claimed is:

1. A heating device for use with a clamp for laminating substrates, the heating device comprising:
   a support member;
   a heater control device coupled directly to the support member;
   a heater cartridge comprising a cartridge housing retaining an insulation pad followed by an infrared reflector followed by a heating element within the cartridge housing, wherein the heating element is operatively coupled to the heater control device to control current flowing through the heating element, and wherein the support member is coupled directly to a clamp for laminating substrates;
   a first sensor located at the heating element and operatively coupled to the heater control device, wherein the heater control device deactivates the current flow through the heating element in response to receiving a temperature reading from the first sensor above the preset maximum operating temperature of the heating element; and
   a second sensor configured to couple near an adhesive layer between substrates to be laminated and operatively coupled to the heater control device, wherein the heater control device deactivates current flow through the heating element in response to receiving temperature reading from the second sensor above a preset laminating temperature.

2. The heating device of claim 1, wherein the insulation pad is formed of ceramic carbon fiber material.

3. The heating device of claim 1, wherein the infrared reflector is formed of a reinforced biaxially-oriented polyethylene terephthalate sheet.

4. The heating device of claim 1, wherein the heating element is exposed on one side in order to contact a surface of the substrate to be laminated.

5. The heating device of claim 1, wherein the cartridge housing retains the insulation pad, infrared reflector and heating element by crimping.

6. The heating device of claim 1, further comprising a clamp with an upper member and a lower member.

7. The heating device of claim 6, wherein the heating device is coupled to one of the upper member or the lower member.

8. A heating device for use with a clamp for laminating substrates, the heating device comprising:
   a support member;
   a heater control device coupled to the support member;
   a heater cartridge comprising a cartridge housing retaining a carbon fiber insulation pad followed by an reinforced biaxially-oriented polyethylene terephthalate infrared reflector followed by a heating element within the cartridge housing, wherein the heating element is operatively coupled to the heater control device to control current flowing through the heating element, and wherein the support member is coupled directly to a clamp for laminating substrates;
   a first sensor located at the heating element and operatively coupled to the heater control device, wherein the heater control device deactivates the current flow through the heating element in response to receiving a temperature reading from the first sensor above the preset maximum operating temperature of the heating element; and
   a second sensor configured to couple near an adhesive layer between substrates to be laminated and operatively coupled to the heater control device, wherein the heater control device deactivates current flow through the heating element in response to receiving temperature reading from the second sensor above a preset laminating temperature.

9. The heating device of claim 8, wherein the heating element is exposed on one side in order to contact a surface of the substrate to be laminated.

10. The heating device of claim 8, wherein the cartridge housing retains the insulation pad, infrared reflector and heating element by crimping.

* * * * *